(12) United States Patent
Lee et al.

(10) Patent No.: US 10,473,804 B2
(45) Date of Patent: Nov. 12, 2019

(54) SEAL AND SEAL ASSEMBLY FOR A FLUID PRESSURE PULSE GENERATING TOOL

(71) Applicant: Evolution Engineering Inc., Calgary (CA)

(72) Inventors: Gavin Gaw-Wae Lee, Calgary (CA); Justin C. Logan, Calgary (CA); Aaron W. Logan, Calgary (CA)

(73) Assignee: Evolution Engineering Inc., Calgary, Alberta (CA)

( * ) Notice: Subject to any disclaimer, the term of this patent is extended or adjusted under 35 U.S.C. 154(b) by 0 days.

(21) Appl. No.: 15/878,750

(22) Filed: Jan. 24, 2018

(65) Prior Publication Data

US 2018/0210100 A1 Jul. 26, 2018

Related U.S. Application Data

(60) Provisional application No. 62/449,891, filed on Jan. 24, 2017.

(51) Int. Cl.
| | | |
|---|---|---|
| *G08B 21/00* | (2006.01) | |
| *G01V 1/04* | (2006.01) | |
| *G01V 1/137* | (2006.01) | |
| *E21B 47/18* | (2012.01) | |

(52) U.S. Cl.
CPC ............... *G01V 1/04* (2013.01); *E21B 47/18* (2013.01); *G01V 1/137* (2013.01); *G01V 2200/16* (2013.01)

(58) Field of Classification Search
CPC ...... G01V 1/04; G01V 1/137; G01V 2200/16; E21B 47/18
USPC .......................................................... 367/83
See application file for complete search history.

(56) References Cited

U.S. PATENT DOCUMENTS

2015/0328803 A1* 11/2015 Burns ................. B29C 33/3857
264/482

* cited by examiner

*Primary Examiner* — Tanmay K Shah
(74) *Attorney, Agent, or Firm* — D'Ambrosio & Menon, PLLC; Usha Menon

(57) ABSTRACT

A seal and seal assembly for a fluid pressure pulse generating tool. The seal comprises an annular seal section comprising an internal sealing surface and an external sealing surface; and an annular heel section. The seal assembly comprises a seal assembly housing with a longitudinally extending bore therethrough for receiving a driveshaft of the tool and the seal enclosed by the seal assembly housing and configured to surround a portion of the driveshaft. The internal sealing surface of the seal is configured to be in sealing contact with the driveshaft and the external sealing surface of the seal is configured to be in sealing contact with an internal surface of the seal assembly housing. The annular heel section of the seal is configured to provide an interference fit with the driveshaft or with the internal surface of the seal assembly housing.

18 Claims, 10 Drawing Sheets

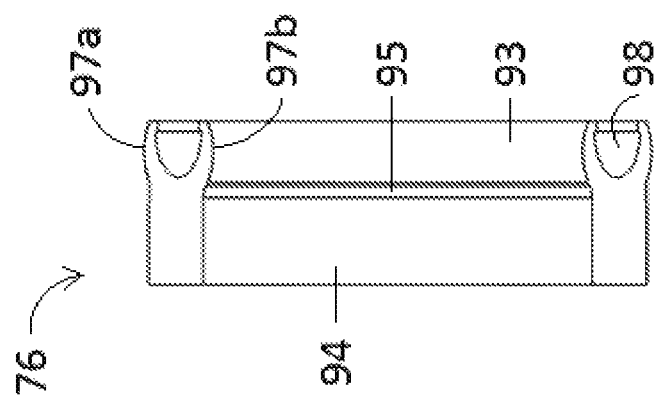

SEAL AND SEAL ASSEMBLY FOR A FLUID PRESSURE PULSE GENERATING TOOL

CROSS-REFERENCE TO RELATED APPLICATION

This application claims priority to U.S. Provisional Application No. 62/449,891, filed Jan. 24, 2017.

TECHNICAL FIELD

This invention relates generally to a seal and a seal assembly for a fluid pressure pulse generating tool, such as a measurement-while-drilling ("MWD") mud pulse telemetry tool.

BACKGROUND

The recovery of hydrocarbons from subterranean zones relies on the process of drilling wellbores. The process includes drilling equipment situated at surface, and a drill string extending from the surface equipment to a below-surface formation or subterranean zone of interest. The terminal end of the drill string includes a drill bit for drilling (or extending) the wellbore. The process also involves a drilling fluid system, which in most cases uses a drilling mud that is pumped through the inside of piping of the drill string to cool and lubricate the drill bit. The drilling mud exits the drill string via the drill bit and returns to surface carrying rock cuttings produced by the drilling operation. The drilling mud also helps control bottom hole pressure and prevent hydrocarbon influx from the formation into the wellbore, which can potentially cause a blow out at surface.

Directional drilling is the process of steering a well from vertical to intersect a target endpoint or follow a prescribed path. At the terminal end of the drill string is a bottom-hole-assembly ("BHA") which comprises 1) the drill bit; 2) a steerable downhole motor of a rotary steerable system; 3) sensors of survey equipment used in logging-while-drilling ("LWD") and/or measurement-while-drilling ("MWD") to evaluate downhole conditions as drilling progresses; 4) means for telemetering data to surface; and 5) other control equipment such as stabilizers or heavy weight drill collars. The BHA is conveyed into the wellbore by a string of metallic tubulars (i.e. drill pipe). MWD equipment is used to provide downhole sensor and status information to surface while drilling in a near real-time mode. This information is used by a rig crew to make decisions about controlling and steering the well to optimize the drilling speed and trajectory based on numerous factors, including lease boundaries, existing wells, formation properties, and hydrocarbon size and location. The rig crew can make intentional deviations from the planned wellbore path as necessary based on the information gathered from the downhole sensors during the drilling process. The ability to obtain real-time MWD data allows for a relatively more economical and more efficient drilling operation.

One type of downhole MWD telemetry known as mud pulse (MP) telemetry involves creating pressure waves ("pulses") in the drilling mud circulating through the drill string. Drilling mud is circulated from surface to downhole using positive displacement pumps. The resulting flow rate of drilling mud is typically constant. The pressure pulses are achieved by changing the flow area and/or path of the drilling fluid as it passes the MWD tool in a timed, coded sequence, thereby creating pressure differentials in the drilling fluid. The pressure differentials or pulses may be either negative pulses or positive pulses. Valves that open and close a bypass stream from inside the drill pipe to the wellbore annulus create a negative pressure pulse. Valves that use a controlled restriction within the circulating drilling mud stream create a positive pressure pulse. Pulse frequency is typically governed by pulse generator motor speed changes. The pulse generator motor requires electrical connectivity with the other elements of the MWD probe.

In MP telemetry systems, as well as in other downhole tools, the pulse generating motor driveline system is subjected to extreme pressure differentials of about 20,000 psi between the external and internal aspects of the tool. To accommodate this large pressure differential, drilling mud is allowed access to areas of the tool which are positioned on one side of a compensation mechanism. Pressure is equalized on the other side of the pressure compensation mechanism within the tool using clean, non-drilling fluid such as hydraulic fluid or silicon oil. Various systems have been used to provide pressure compensation including metallic bellows, rubber compensation membranes, and piston compensations with springs. Given the large temperature differentials from surface to downhole, especially in colder drilling climates, there is a high chance of temperature related failures for MWD tool components, in particular rubber membranes used for pressure compensation.

During MP telemetry the operation of a mud pulser can cause wear and breakdown of the annular seal which fluidly seals the rotating driveshaft of the mud pulser from the external drilling mud. The motor of the mud pulser is typically enveloped in lubricating oil which is contained in the pulser housing by the annular seal. With time, oil may leak out and drilling mud may leak in through the worn seal and the seal must be replaced before any substantial amount of mud leaks in. Drilling mud within the motor housing is detrimental to the operation of the motor, bearings and gearbox, and these components will typically be destroyed if a substantial amount of drilling mud enters the motor housing.

SUMMARY

According to a first aspect, there is provided a seal for surrounding a portion of a driveshaft of a fluid pressure pulse generating tool. The seal comprises: (a) an annular seal section comprising an internal sealing surface and an external sealing surface; and (b) an annular heel section.

The internal sealing surface may comprise an internal sealing lip with a curved convex sealing surface configured to compress on contact with an adjacent surface. The external sealing surface may comprise an external sealing lip with a curved convex sealing surface configured to compress on contact with an adjacent surface. A spring may be positioned between the internal sealing lip and the external sealing lip.

The heel section may be longitudinally extended relative to the seal section.

The seal may further comprise an annular gap section positioned between the seal section and the heel section. The gap section may have an outer diameter less than the outer diameter of the heel section. The heel section may comprise at least one channel extending along an external surface of the heel section.

The seal may further comprise an annular gap section positioned between the seal section and the heel section. The gap section may have an inner diameter greater than the inner diameter of the heel section. The heel section may comprise at least one channel extending along an internal surface of the heel section.

According to a second aspect, there is provided a seal assembly for a fluid pressure pulse generating tool comprising a seal assembly housing with a longitudinally extending bore therethrough for receiving a driveshaft of the tool and a seal enclosed by the seal assembly housing and configured to surround a portion of the driveshaft. The seal comprises: (a) an annular seal section comprising an internal sealing surface configured to be in sealing contact with the driveshaft and an external sealing surface configured to be in sealing contact with an internal surface of the seal assembly housing; and (b) an annular heel section configured to provide an interference fit with the driveshaft or with the internal surface of the seal assembly housing.

The internal sealing surface may comprise an internal sealing lip with a curved convex sealing surface configured to compress on contact with the driveshaft. The external sealing surface may comprise an external sealing lip with a curved convex sealing surface configured to compress on contact with the internal surface of the seal assembly housing. A spring may be positioned between the internal sealing lip and the external sealing lip.

The heel section may be longitudinally extended relative to the seal section.

The annular heel section may be configured to provide an interference fit with the internal surface of the seal assembly housing and the seal may further comprise an annular gap section positioned between the seal section and the heel section. The gap section may have an outer diameter less than the outer diameter of the heel section. The heel section may comprise at least one channel extending along an external surface of the heel section.

The annular heel section may be configured to provide an interference fit with the driveshaft and the seal may further comprises an annular gap section positioned between the seal section and the heel section. The gap section may have an inner diameter greater than the inner diameter of the heel section. The heel section may comprise at least one channel extending along an internal surface of the heel section.

The seal assembly housing may comprise a first section and a second section configured to releasably mate with the first section.

According to a third aspect, there is provided a driveshaft unit for a fluid pressure pulse generating tool comprising: (a) a longitudinally extending cylindrical driveshaft with a first end for coupling with a fluid pressure pulse generator of the tool and an opposed second end for coupling with a pulse generating motor of the tool; and (b) the seal assembly of the second aspect surrounding a portion of the driveshaft.

According to a fourth aspect, there is provided a fluid pressure pulse generating tool comprising: (a) a fluid pressure pulse generator; (b) a pulser assembly comprising a pulser assembly housing that houses a motor and a driveshaft extending from the motor out of the pulser assembly housing and coupled with the fluid pressure pulse generator; (c) an annular seal surrounding a portion of the driveshaft and enclosed by the pulser assembly housing, the annular seal configured to be in sealing contact with the driveshaft; and (d) the seal of the first aspect surrounding a portion of the driveshaft between the annular seal and the motor, the seal configured to be in sealing contact with the driveshaft.

According to a fifth aspect, there is provided a fluid pressure pulse generating tool comprising: (a) a fluid pressure pulse generator; (b) a pulser assembly comprising a pulser assembly housing that houses a motor and a driveshaft extending from the motor out of the pulser assembly housing and coupled with the fluid pressure pulse generator; (c) an annular seal surrounding a portion of the driveshaft and enclosed by the pulser assembly housing, the annular seal configured to be in sealing contact with the driveshaft; and (d) the seal assembly of the second aspect surrounding a portion of the driveshaft between the annular seal and the motor.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

FIG. 10 is a side sectioned view of the back-up seal of the first embodiment.

DETAILED DESCRIPTION

Directional terms such as "uphole" and "downhole" are used in the following description for the purpose of providing relative reference only, and are not intended to suggest any limitations on how any apparatus is to be positioned during use, or to be mounted in an assembly or relative to an environment.

The embodiments described herein generally relate to a seal and a seal assembly for a fluid pressure pulse generating tool. The tool is typically a measurement while drilling (MWD) tool which may be used for mud pulse (MP) telemetry in downhole drilling wherein a drilling fluid or mud (herein referred to as "drilling mud") is used to transmit telemetry pulses to surface. The tool may alternatively be used in other methods where it is necessary to generate a fluid pressure pulse.

Figure 4:
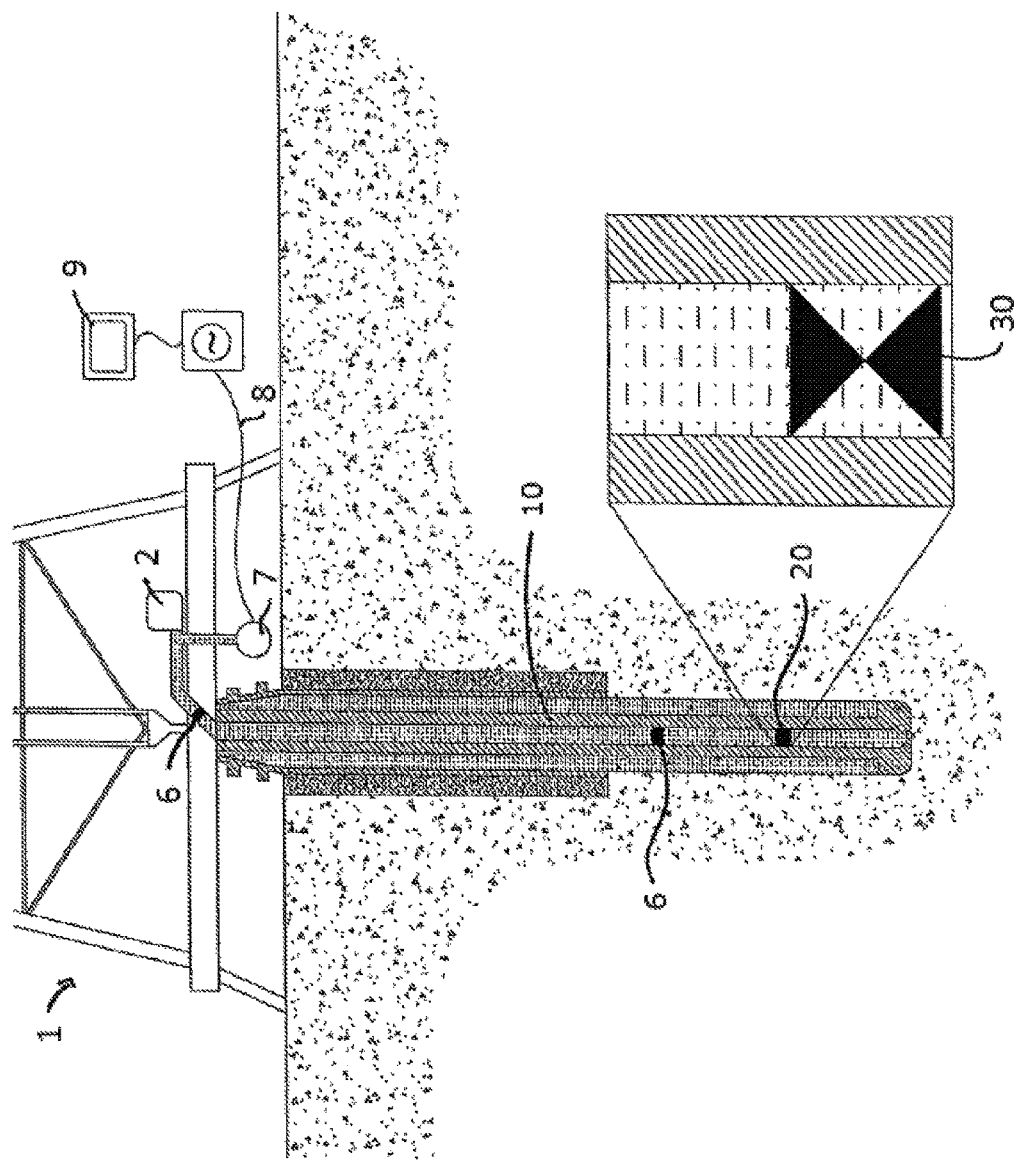
FIG. 4 is a schematic of a mud pulse (MP) telemetry method in a drill string in an oil and gas borehole using a MWD telemetry tool.

Referring to the drawings and specifically to FIG. 4, there is shown a schematic representation of MP telemetry operation using a fluid pressure pulse generator 30. In downhole drilling equipment 1, drilling mud is pumped down a drill string by pump 2 and passes through a MWD tool 20 including the fluid pressure pulse generator 30. The fluid pressure pulse generator 30 generates pressure pulses (represented schematically as block 6 in mud column 10). Information acquired by downhole sensors (not shown) is transmitted in specific time divisions by pressure pulses 6 in the mud column 10. More specifically, signals from sensor modules (not shown) in the MWD tool 20, or in another downhole probe (not shown) communicative with the MWD tool 20, are received and processed in a data encoder in the MWD tool 20 where the data is digitally encoded as is well established in the art. This data is sent to a controller in the MWD tool 20 which controls timing of the fluid pressure pulse generator 30 to generate pressure pulses 6 in a controlled pattern which contain the encoded data. The pressure pulses 6 are transmitted to the surface and detected by a surface pressure transducer 7 and decoded by a surface computer 9 communicative with the transducer by cable 8. The decoded signal can then be displayed by the computer 9 to a drilling operator. The characteristics of the pressure pulses 6 are defined by duration, shape, and frequency and these characteristics are used in various encoding systems to represent binary data.

Figure 5:
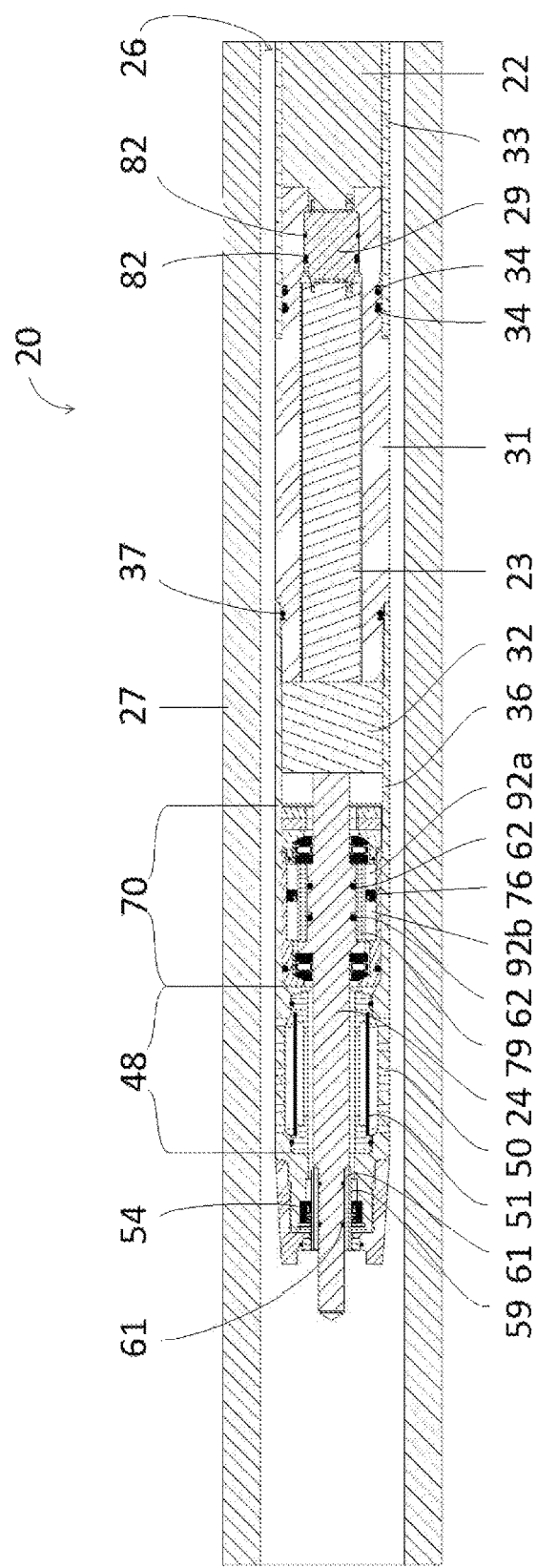
FIG. 5 is a longitudinally sectioned view of a mud pulser section of the MWD telemetry tool comprising a driveshaft, an annular seal surrounding the driveshaft and a seal assembly enclosing a back-up seal according to a first embodiment.

Referring to FIG. 5, there is shown a pulser assembly 26 of the MWD tool 20 positioned inside a drill collar 27. The pulser assembly 26 takes measurements while drilling and drives the fluid pressure pulse generator (not shown) to generate pressure pulses 6. An annular gap between the inside of the drill collar 27 and the pulser assembly 26 allows for flow of drilling mud along the drill collar 27. The fluid pressure pulse generator generally comprises a stator (not shown) and a rotor (not shown) and may be any fluid pressure pulse generator known in the art. The stator may be fixed to the drill collar 27 or the pulser assembly 26 and the rotor is generally fixed to a driveshaft 24 extending out of a pressure compensated housing 36 of the pulser assembly 26. The pulser assembly 26 includes a driveshaft subassembly, a motor subassembly and an electronics subassembly.

The driveshaft subassembly comprises pressure compensated housing 36 enclosing the driveshaft 24. A pressure compensation device 48, annular seal 54, and seal assembly 70 each surround a different portion of the driveshaft 24 and are enclosed by the pressure compensated housing 36. The motor subassembly includes a pressure compensated housing 31 enclosing a pulse generating motor 23 and a gearbox 32. The electronics subassembly includes an electronics housing 33 which has a low pressure (approximately atmospheric) internal environment housing control electronics 22 and other components (not shown) required by the MWD tool 20 to receive direction and inclination information and measurements of drilling conditions and encode this information and these measurements into telemetry data for transmission by the fluid pressure pulse generator as is known in the art. The telemetry data is converted into motor control signals by a controller (not shown) in the control electronics 22 and these signals are sent to the pulse generating motor 23 to rotate the driveshaft 24 and rotor in a controlled pattern to generate pressure pulses 6 representing the telemetry data for transmission to surface.

The motor subassembly and the electronics subassembly are physically and electronically coupled together by a feed-through connector 29. Feed through connector 29 may be a typical connector known in the art and is generally pressure rated to withstand pressure differential between the low-pressure electronics subassembly (approximately atmospheric pressure) and the pressure compensated motor subassembly where pressures can reach 20,000 psi. The feed through connector 29 has a high pressure end facing the motor subassembly and a low pressure end facing the electronics subassembly. Sealing O-rings 82 are positioned on the external surface of the feed through connector 29 to provide a fluid seal between the feed through connector 29 and the pressure compensated housing 31 of the motor subassembly. O-ring seals 34 are also located on an external surface of the pressure compensated housing 31 of the motor subassembly to provide a fluid seal between the pressure compensated housing 31 of the motor subassembly and the electronics housing 33 of the electronics subassembly. Electrical interconnections (not shown) extend axially through the length of the feed through connector 29; these electrical interconnections include electric motor interconnects which transmit power and control signals between components in the electronics subassembly and the pulse generating motor 23 in the motor subassembly.

An O-ring seal 37 located on an external surface of the pressure compensated housing 31 of motor subassembly provides a fluid seal between the pressure compensated housing 31 of the motor subassembly and the pressure compensated housing 36 of the driveshaft subassembly. In an alternative embodiment (not shown) the pressure compensated housing of the driveshaft subassembly and the pressure compensated housing of the motor subassembly may be a continuous, unitary pressure compensated housing.

The motor subassembly and driveshaft subassembly are filled with lubrication liquid such as hydraulic oil or silicon oil; this lubrication liquid is fluidly separated from the drilling mud flowing external to the pulser assembly 26 by annular seal 54. The pressure compensation device 48 comprises a flexible membrane 51 in fluid communication with the lubrication liquid on one side and with drilling mud on the other side via ports 50 in the pressure compensated housing 36 of the driveshaft subassembly. The pressure compensation device 48 substantially equalizes the pressure of lubrication liquid inside the driveshaft subassembly and motor subassembly with the pressure of the drilling mud outside the pulser assembly 26. Without pressure compensation, it would be difficult for the driveshaft 24 to rotate due to an excessive pressure differential between the internal lubrication liquid and the external drilling mud. The torque required to rotate the driveshaft 24 without pressure compensation would require high current draw and may lead to excessive battery consumption and increased costs. In alternative embodiments (not shown), the pressure compensation device 48 may be any pressure compensation device known in the art, such as pressure compensation devices that utilize pistons, metal membranes, or a bellows style pressure compensation mechanism. The annular seal 54 may be a standard polymer lip seal and wiper located near the downhole end of driveshaft 24 and enclosed by the pressure compensated housing 36 of the driveshaft subassembly. The annular seal 54 allows rotation of the driveshaft 24 while preventing drilling mud from entering the pressure compensated housing 36 and lubrication liquid from leaking out of the pressure compensated housing 36.

Figure 6:
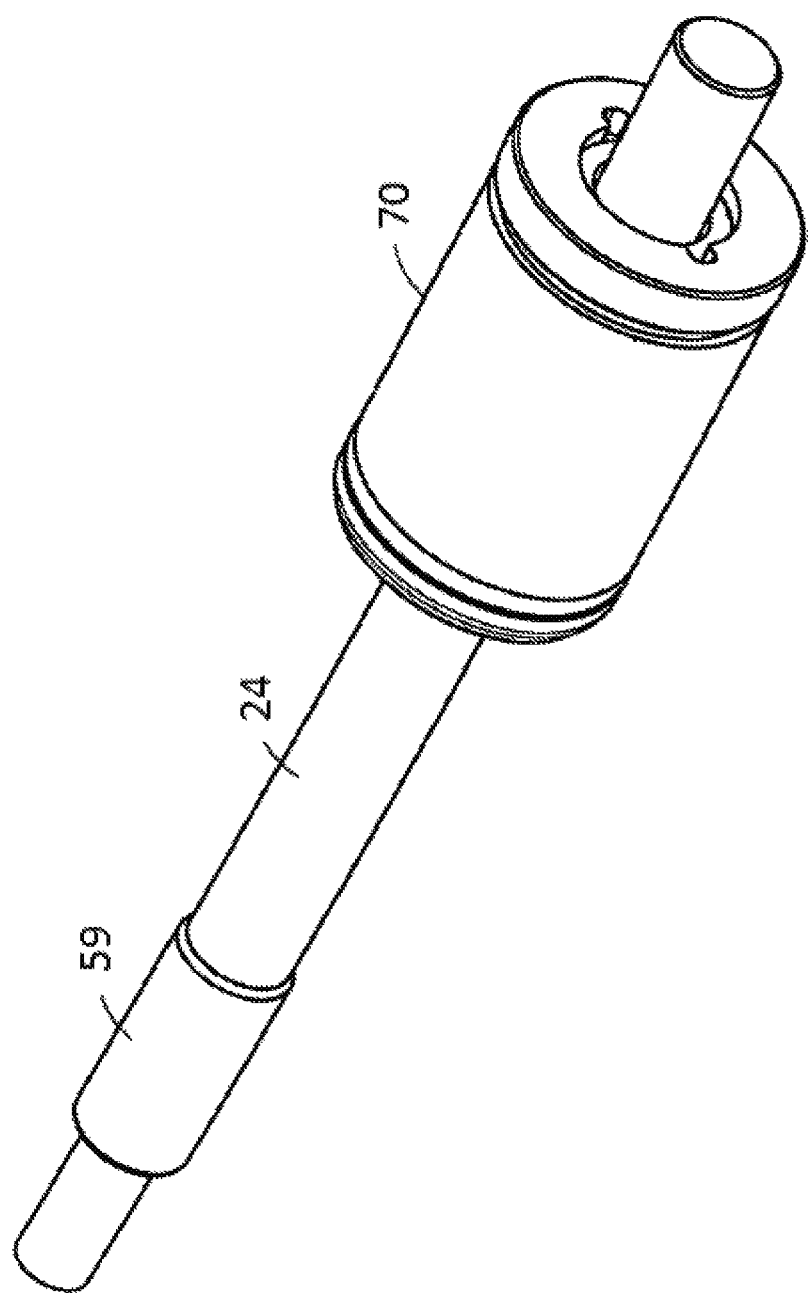
FIG. 6 is a perspective view of a driveshaft unit comprising the driveshaft, the seal assembly and a sealing cylinder for the annular seal.
Figure 7:
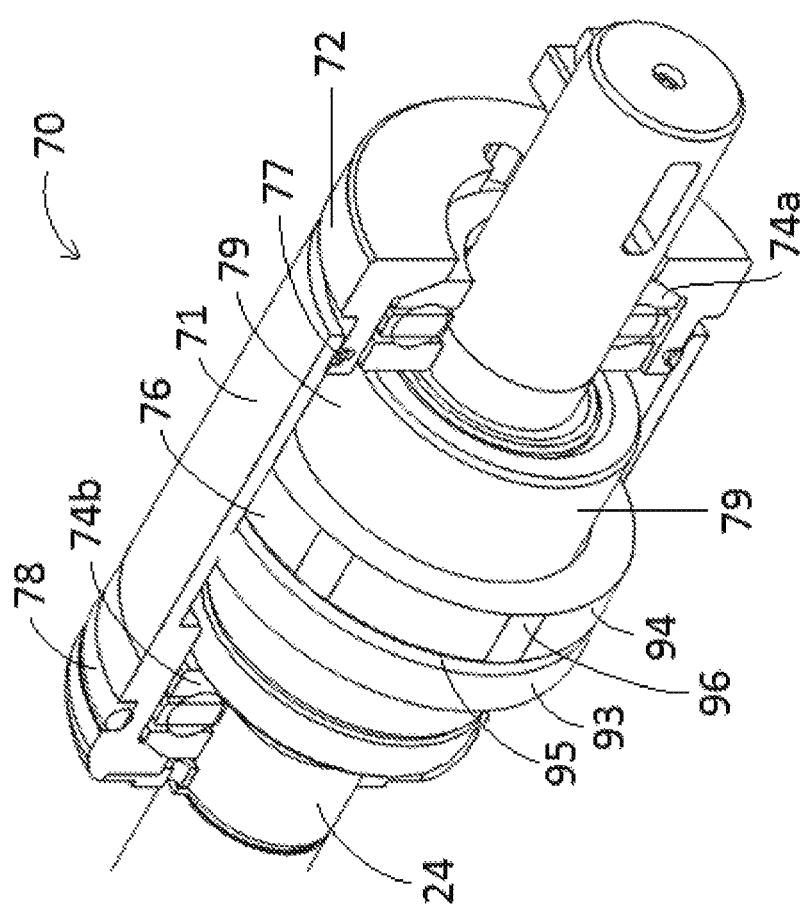
FIG. 7 is a partially sectioned perspective view of the uphole end of the driveshaft unit of FIG. 6 showing the sealing assembly enclosing the back-up seal of the first embodiment.
Figure 8:
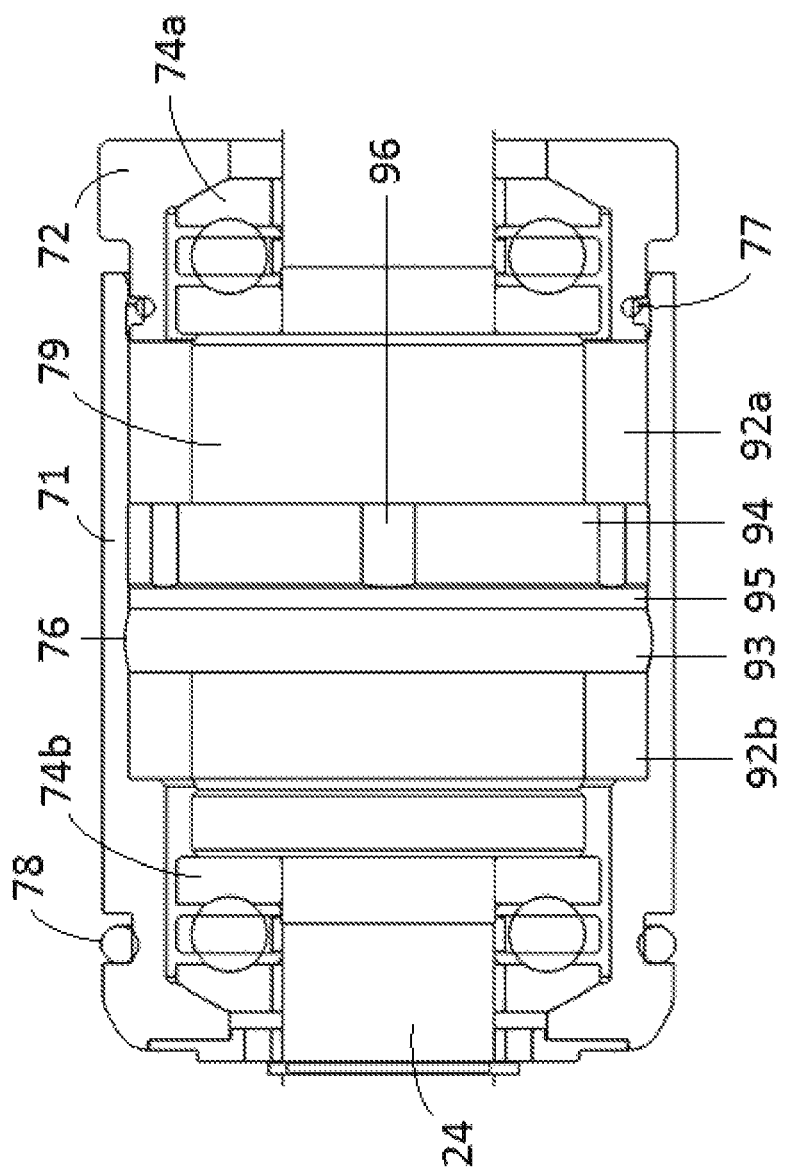
FIG. 8 is a side view of the partially sectioned driveshaft unit of FIG. 7.

Referring now to FIGS. 6-8 there is shown a driveshaft unit comprising the driveshaft 24 with a sealing cylinder 59 near the downhole end of the driveshaft 24 and the seal assembly 70 near the uphole end of the driveshaft 24. The sealing cylinder 59 and an additional sealing cylinder 79 enclosed by the seal assembly 70 surround the driveshaft 24 and are releasably coupled to the driveshaft 24. The sealing cylinders 59, 79 may be made of ceramic material, such as zirconia, or carbide and provide a surface against which the annular seal 54 and a back-up seal 76 according to a first embodiment can seal upon respectively. As shown in FIG. 5, a pair of O-ring seals 61 are positioned between the internal surface of the sealing cylinder 59 and the external surface of the driveshaft 24 and a pair of O-rings seals 62 are positioned between the internal surface of the sealing cylinder 79 and the external surface of the driveshaft 24; these O-ring seals provide a fluid seal and may also create a pressure lock to releasably lock the cylinders 59, 79 on the driveshaft 24. Sealing cylinder 59 and sealing cylinder 79 may protect the driveshaft 24 from wear and may generally be easily replaced if they become worn over time. In alternative embodiments however, one or both sealing cylinders 59, 79 may not be present.

The seal assembly 70 comprises a generally cylindrical seal assembly housing 71 surrounding the driveshaft 24 with an end cap 72 mated with the uphole end of the seal housing 71. A retention O-ring 77 positioned between the internal surface of the housing 71 and the external surface of the end cap 72 holds the end cap 72 in place without the need for an interference fit, however other means of mating the end cap 72 with the housing 71 could be used as would be apparent to a person skilled in the art. The downhole end of the seal assembly housing 71 has a tapered external surface to correspond to a tapered shoulder on the internal surface of the pressure compensated housing 36 of the driveshaft subassembly to allow for concentric mating of the seal assembly housing 71 in the pressure compensated housing 36 as shown in FIG. 5. An O-ring seal 78 is located on the external surface of the seal assembly housing 71 to provide a fluid seal between the seal assembly housing 71 and the pressure compensated housing 36 of the driveshaft subassembly. A pair of ring shaped thrust bearings 74a, 74b surround the driveshaft 24; one of the thrust bearings 74a is positioned near the uphole end of the seal assembly 70 and the other thrust bearing 74b is positioned near the downhole end of the seal assembly 70. There is a small gap between the internal surface of the thrust bearings 74a, 74b and the external surface of the driveshaft 24; and this gap is filled with lubrication liquid. Exemplary thrust bearings 74 that may be utilized in the seal assembly 70 include single direction thrust ball bearings from SKF™. In alternative embodiments, the thrust bearing 74a, 74b may not be present.

The seal assembly housing 71, mated end cap 72 and sealing cylinder 79 form an uphole chamber 92a and a downhole chamber 92b fluidly separated by back-up seal 76 (shown in FIGS. 5 and 8). The chambers 92a, 92b are each filled with lubrication liquid and back-up seal 76 fluidly separates the lubrication liquid in the uphole chamber 92a from the lubrication liquid in the downhole chamber 92b. The downhole chamber 92b is fluidly connected to the downhole section of the driveshaft subassembly which includes the pressure compensation device 48 and the annular seal 54 whereas the uphole chamber 92a is fluidly connected to the motor subassembly which includes the gearbox 32 and motor 23.

Figure 1:
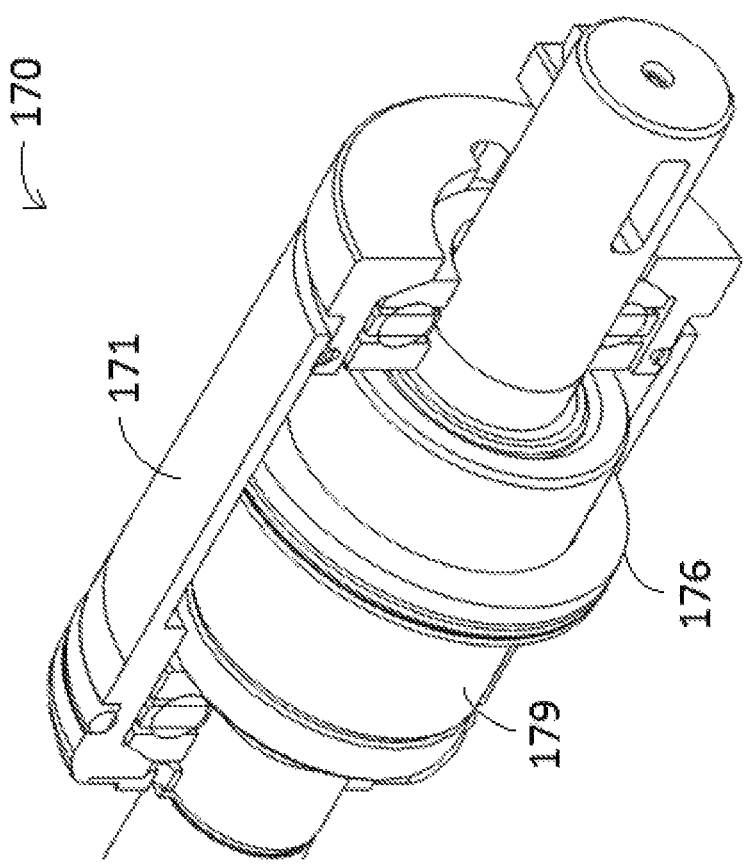
FIG. 1 is a partially sectioned perspective view of a prior art seal assembly including a prior art back-up seal surrounding a driveshaft of a MWD telemetry tool.
Figure 2:
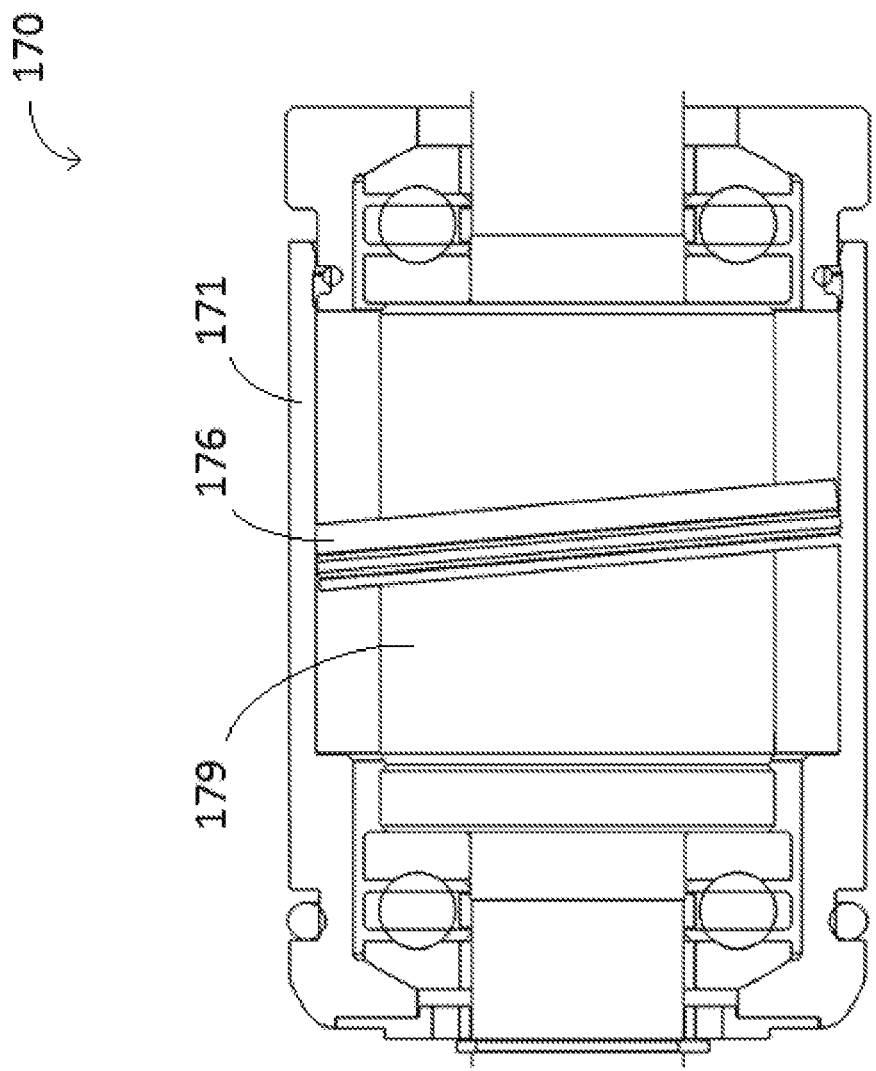
FIG. 2 is a side view of the partially sectioned prior art seal assembly of FIG. 1 with the prior art back-up seal eccentrically mounted on the driveshaft.
Figure 3:
FIG. 3 is a side sectioned view of the prior art back-up seal.

A prior art seal assembly 170 including a prior art back-up seal 176 is shown in FIGS. 1 and 2 and a side sectioned view of the prior art back-up seal 176 is shown in FIG. 3. The prior art back-up seal 176 may be a standard spring loaded lip seal, such as SKF RO1-AF™ which may be knocked out of alignment during operation of the MWD tool. If the prior art back-up seal 176 is knocked out of alignment or incorrectly mounted it may become eccentrically mounted as shown in FIG. 2 where the contact surfaces of back-up seal 176 are not in correct alignment with the contact surfaces of sealing cylinder 179 and the internal surface of seal assembly housing 171. Eccentric mounting of back-up seal 176 may cause fluid leaks allowing mixing of the lubrication liquid in the driveshaft subassembly with the lubrication liquid in the motor subassembly.

Figure 9:
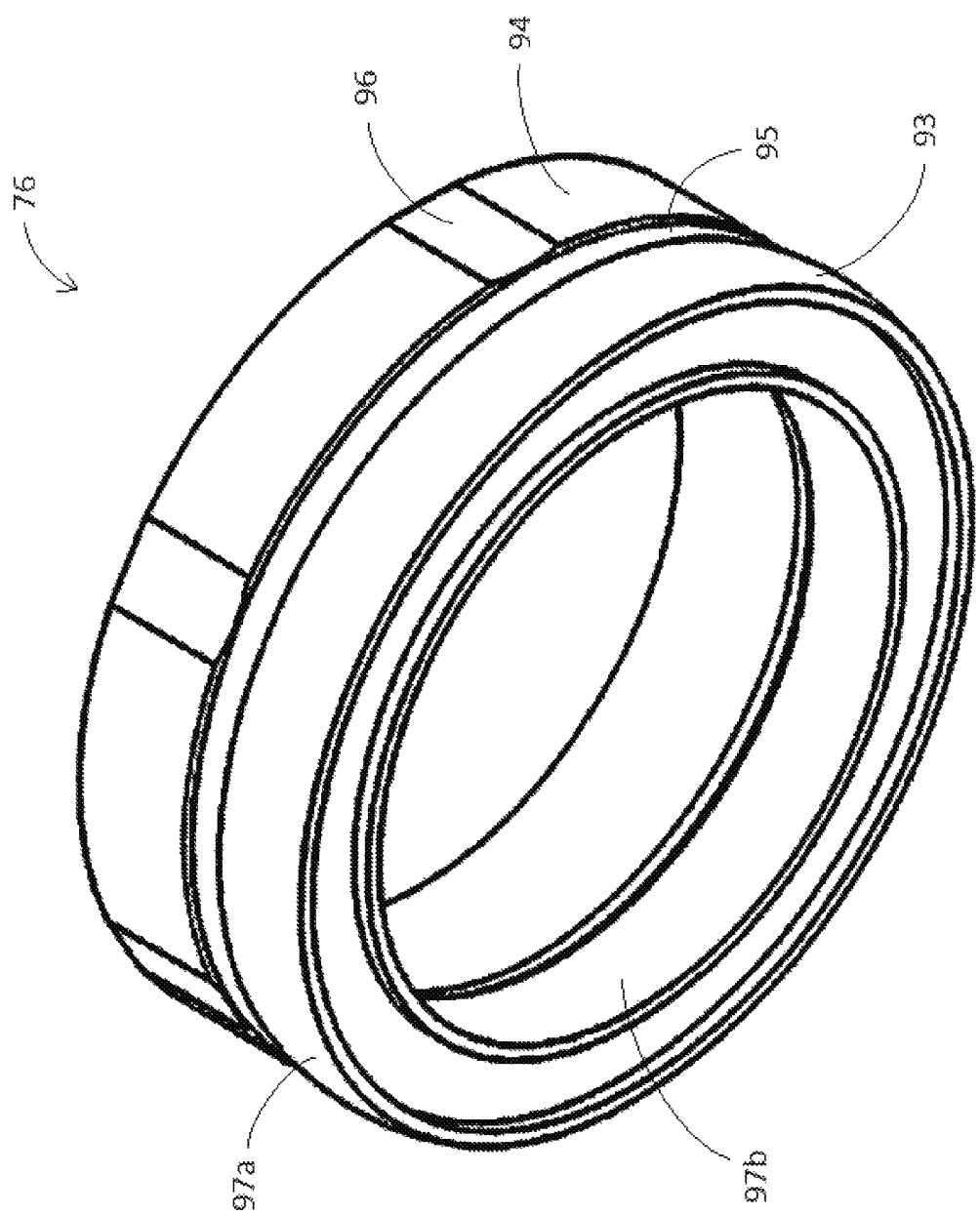
FIG. 9 is a perspective view of the back-up seal of the first embodiment.

Referring now to FIGS. 9 and 10 there is shown back-up seal 76 according to the first embodiment comprising an annular seal section 93, an annular heel section 94 with an annular gap (cut) section 95 between the seal section 93 and heel section 94.

The seal section 93 has an external sealing lip 97a on its external surface and an internal sealing lip 97b on its internal surface. The external sealing lip 97a has a curved convex surface that compresses to provide sealing contact with the internal surface of the seal assembly housing 71 and the internal sealing lip 97b has a curved convex surface that compresses to provide sealing contact with sealing cylinder 79. An annular spring (not shown) may be positioned within a channel 98 (shown in FIG. 10) between the external sealing lip 97a and the internal sealing lip 97b. The spring may apply a radial force to the sealing lips 97a, 97b which may increase the strength of the sealing contact of the sealing lips 97a, 97b with adjacent surfaces compared to when the spring is not present.

In alternative embodiments when the sealing cylinder 79 is not present, the internal sealing lip 97b may be in sealing contact with the driveshaft 24. By "sealing contact with the driveshaft" it is meant that the internal sealing lip 97b may be in sealing contact with the driveshaft 24 or with a structure such as sealing cylinder 79 which surrounds the driveshaft 24. In further alternative embodiments, the back-up seal 76 may be provided without the seal assembly housing 71 and the external sealing lip 97a may seal against the internal surface of the pressure compensated housing 36. In alternative embodiments, the seal section 93 may not comprise convex sealing lips 97a, 97b and may instead comprise any internal sealing surface configured to be in sealing contact with the sealing cylinder 79 or the driveshaft 24 if the sealing cylinder 79 is not present, and any external sealing surface configured to be in sealing contact with the internal surface of the seal assembly housing 71 or the internal surface of the pressure compensated housing 36 if the seal assembly housing 71 is not present.

The heel section 94 is longitudinally extended relative to the seal section 93 and may help keep the back-up seal 76 concentrically mounted during operation of the MWD tool 20. A plurality of channels 96 formed by flattened grooves in the external surface of the heel section 94 extend longitudinally between the outer edge of the heel section 94 and the gap section 95. The outer diameter of the gap section 95 is slightly reduced compared to the outer diameter of the heel section 94. The seal section 93 and the heel section 94 are configured to provide an interference (press) fit with the seal assembly housing 71 thereby preventing rotational movement of back-up seal 76, while still allowing rotation of the driveshaft 24 relative to back-up seal 76. Lubrication liquid from uphole chamber 92a flows into channels 96 and a thin layer of lubrication liquid fills the gap section 95 which may reduce the likelihood of a pressure lock caused by air being trapped between the seal section 93 and the heel section 94 as a result of the interference fit. The channels 96 also reduce the external surface area of the heel section 94 that is in contact with the internal surface of the seal assembly housing 71 and this may also reduce the likelihood of a pressure lock. Furthermore, the reduced contact surface area of the heel section 94 may reduce the interference fit between the heel section 94 and the seal assembly housing 71 such that the interference fit allows axial movement of back-up seal 76 while preventing rotational movement of back-up seal 76 relative to the seal assembly housing 71.

Axial movement of back-up seal 76 may allow for pressure equalization between the lubricating liquid in the uphole chamber 92a and the lubrication liquid in the downhole chamber 92b and vice versa. In alternative embodiments, channels 96 may be any shape, for example, the channels may spiral around the heel section 94 or may be an axial groove along the surface of the heel section 94.

In alternative embodiments, an interference fit may be established between the internal surface of the heel section 94 and the external surface of the sealing cylinder 79 or the driveshaft 24 (when the sealing cylinder 79 is not present) so that back-up seal 76 rotates with the driveshaft 24 relative to the seal assembly housing 71. In these alternative embodiments, the channels 96 may be positioned on the internal surface of the heel section 94 and the inner diameter of the gap section 95 may be slightly greater than the inner diameter of the heel section 94 such the lubrication liquid flows into the channels 96 and a thin layer of lubrication liquid is contained between the internal surface of the gap section 95 and the external surface of the sealing cylinder 79 or the driveshaft 24.

There are a variety of downhole effects related to vibration, pressure differential, temperature shock and exposure to abrasive drilling mud which may cause failure of the annular seal 54 or membrane 51 of the pressure compensation device 48. If the annular seal 54 or membrane 51 fails then drilling mud can enter the pressure compensated housing 36 of the driveshaft subassembly. Back-up seal 76 provides a fluid barrier to prevent or reduce lubrication liquid passing between the driveshaft subassembly and the motor subassembly in case of failure of the annular seal 54 or the pressure compensation device 48, thus reducing the likelihood of drilling mud entering the motor subassembly if there is a failure of the annular seal 54 or the membrane 51 of the pressure compensation device 48. The typically expensive components of the motor subassembly, namely the gearbox 32 and the pulse generating motor 23, may therefore be protected from damage caused by invading drilling mud. If drilling mud does enter the driveshaft subassembly due to failure of the annular seal 54 or the membrane 51, the thrust bearings 74 and other bearings in the driveshaft subassembly may still be able to operate in the harsh environment presented by the presence of drilling mud for a period of time. The MWD tool 20 may therefore still be able to operate for a period of time after drilling mud has entered the driveshaft subassembly until a scheduled trip out of hole for the MWD tool 20, which may reduce operation costs by reducing the number of trip outs required. The components of the driveshaft subassembly may be serviced or replaced at a reduced cost compared to replacement of the components of the motor subassembly. For example, a driveshaft unit comprising the driveshaft 24 and seal assembly 70 as shown in FIG. 6 may be sold as a separate stand alone replacement unit which may be quickly and easily fitted in the MWD tool 20 to replace a damaged driveshaft unit. The life of the MWD tool 20 may therefore be extended.

Back-up seal 76 also separates the lubrication liquid in the driveshaft subassembly from the lubrication liquid in the motor subassembly, thereby allowing a different lubrication liquid composition in each of the subassemblies. For example, the lubrication liquid in the driveshaft subassembly may be lubricating oil with a higher viscosity than lubrication oil in the motor subassembly. Higher viscosity oil in the driveshaft subassembly may be chosen to aid in preventing oil leakage at the annular seal 54, whereas lower viscosity oil in the motor subassembly may be chosen to optimize motor operating conditions which may reduce operation costs and prolong the life of the motor 23 and gearbox 32. The lubrication liquid in each of the two subassemblies can be chosen to thermally match each other or to be complimentary. For example, the lubrication liquid in the driveshaft subassembly may be less thermally expansive than the lubrication liquid in the motor subassembly, so as to present less thermal expansion pressure on the membrane 51 of the pressure compensation device 48. A different optimal lubrication liquid for each of the driveshaft subassembly and motor subassembly can therefore be chosen rather than requiring a lubrication liquid which is a compromise for operation of both the driveshaft and motor subassemblies. During servicing, lubrication liquid can be drained from either the driveshaft subassembly or the motor subassembly or both, and replaced with new lubrication liquid depending on servicing requirements. This may provide faster servicing of the MWD tool 20 if only one of the driveshaft or motor subassemblies needs to be drained at the time. In addition, as the lubrication liquid composition can be different in each of the driveshaft subassembly and the motor subassembly, the life of the lubrication liquid in each subassembly may be different, which can be factored into the servicing requirements as the driveshaft and motor subassemblies can be independently drained and serviced. Furthermore, provision of different compositions of lubrication liquid in the driveshaft subassembly and the motor subassembly, may provide an indicator of life of back-up seal 76. More specifically, if there is a change in composition of the lubrication liquid in the motor subassembly or in the driveshaft subassembly, this may indicate that back-up seal 76 has been compromised and needs to be replaced, as lubricating liquid is being transferred from the driveshaft subassembly to the motor subassembly or vice versa.

In the embodiments of the seal assembly 70 shown in FIGS. 7 and 8, the back-up seal 76 is positioned on the sealing cylinder 79 with the seal section 93 downhole of the heel section 94 so that the seal section 93 is facing the driveshaft subassembly and the heel section 94 is facing the motor subassembly. The pressure of the lubricating liquid in the driveshaft subassembly may be greater than the pressure of the lubricating liquid in the motor subassembly as the lubricating liquid in the driveshaft subassembly is subjected to pressure equalization with drilling mud by the pressure compensation device 48. Providing the seal section 93 towards the driveshaft subassembly may therefore reduce the amount of transfer of lubrication liquid across the back-up seal 76; however in alternative embodiments back-up seal 76 may be positioned with the seal section 93 uphole of the heel section 94. In alternative embodiments, back-up seal may comprise the seal section 93 and the annular heel section 94 without the gap section 95.

The seal assembly 70 including back-up seal 76 may be manufactured and sold as a standalone item that may be easily fitted within the pulser assembly 26 of the MWD tool 20 or any other tool that generates fluid pressure pulses. The assembly 70 can be readily removed and serviced or replaced if any of the components, such as back-up seal 76, become worn or damaged. As the end cap 72 is releasably mounted to the seal assembly housing 71, parts within the seal assembly housing 71 may be accessed by removal of the end cap 72 for easy serviceability. In alternative embodiments, the seal assembly housing need not comprise an end cap 72 and seal housing 71, and may instead comprise sectional housing parts which releasably fit together. In a further alternative embodiment, the seal assembly housing may be a unitary housing and not a multi-sectioned housing.

In the assembled MWD tool shown in FIG. 5, the seal assembly 70 is positioned uphole of the pressure compensation device 48 and downhole of the gearbox 32 and pulse generating motor 23 of the motor subassembly to protect the motor 23 and gearbox 32 from drilling mud in the event of failure of the annular seal 54 and/or membrane 51 of the pressure compensation device 48. In alternative embodiments however, the seal assembly 70 may be positioned on the downhole side of the pressure compensation device 48 or at any position on the driveshaft between the annular seal 54 and the motor subassembly. In alternative embodiments, back-up seal housing 71 and other components of the seal assembly, such as the thrust bearings 74a, 74b and sealing cylinder 79, need not be present and back-up seal 76 may simply surround the driveshaft 24 and be enclosed by the pressure compensated housing 36 of the driveshaft subassembly. In these alternative embodiments the external sealing lip 97a may be in sealing contact with the internal surface of the pressure compensated housing 36. The innovative aspects of the invention apply equally in embodiments such as these.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. For example, while the MWD tool 20 has generally been described as being orientated with the pressure pulse generator at the downhole end of the tool, the tool may be orientated with the pressure pulse generator at the uphole end of the tool. The innovative aspects of the invention apply equally in embodiments such as these.

The invention in its broader aspects is therefore not limited to the specific details, representative apparatus and methods, and illustrative examples shown and described. Accordingly, departures may be made from such details without departing from the spirit or scope of the general concept.

The invention claimed is:

1. A fluid pressure pulse generating tool comprising:
   (a) a fluid pressure pulse generator;
   (b) a pulser assembly comprising a pulser assembly housing that houses a motor and a driveshaft extending from the motor out of the pulser assembly housing and coupled with the fluid pressure pulse generator;
   (c) an annular seal surrounding a portion of the driveshaft and enclosed by the pulser assembly housing, the annular seal configured to be in sealing contact with the driveshaft or a sealing cylinder surrounding the driveshaft; and
   (d) a seal surrounding a portion of the driveshaft between the annular seal and the motor, the seal comprising:
      (i) an annular seal section comprising an internal sealing surface in sealing contact with the driveshaft or a sealing cylinder surrounding the driveshaft and an external sealing surface; and
      (ii) an annular heel section.

2. The fluid pressure pulse generating tool of claim 1, wherein the internal sealing surface comprises an internal sealing lip with a curved convex sealing surface configured to compress on contact with the driveshaft or sealing cylinder and/or the external sealing surface comprises an external sealing lip with a curved convex sealing surface configured to compress on contact with an adjacent surface.

3. The fluid pressure pulse generating tool of claim 2, wherein the seal section comprises the internal sealing lip and the external sealing lip and a spring is positioned between the internal sealing lip and the external sealing lip.

4. The fluid pressure pulse generating tool of claim 1, wherein the heel section is longitudinally extended relative to the seal section.

5. The fluid pressure pulse generating tool of claim 1, further comprising an annular gap section positioned between the seal section and the heel section, wherein the gap section has an outer diameter less than the outer diameter of the heel section.

6. The fluid pressure pulse generating tool of claim 5, wherein the heel section comprises at least one channel extending along an external surface of the heel section.

7. The fluid pressure pulse generating tool of claim 1, further comprising an annular gap section positioned between the seal section and the heel section, wherein the gap section has an inner diameter greater than the inner diameter of the heel section.

8. The fluid pressure pulse generating tool of claim 7 wherein the heel section comprises at least one channel extending along an internal surface of the heel section.

9. A fluid pressure pulse generating tool comprising:
   (a) a fluid pressure pulse generator;
   (b) a pulser assembly comprising a pulser assembly housing that houses a motor and a driveshaft extending from the motor out of the pulser assembly housing and coupled with the fluid pressure pulse generator;
   (c) an annular seal surrounding a portion of the driveshaft and enclosed by the pulser assembly housing, the annular seal configured to be in sealing contact with the driveshaft or a sealing cylinder surrounding the driveshaft; and
   (d) a seal assembly comprising a seal assembly housing with a longitudinally extending bore therethrough that receives the driveshaft and a seal enclosed by the seal assembly housing, the seal comprising:
      (i) an annular seal section comprising an internal sealing surface in sealing contact with the driveshaft or a sealing cylinder surrounding the driveshaft and an external sealing surface in sealing contact with an internal surface of the seal assembly housing; and
      (ii) an annular heel section providing an interference fit with the driveshaft or with the internal surface of the seal assembly housing.

10. The fluid pressure pulse generating tool of claim 9, wherein the internal sealing surface comprises an internal sealing lip with a curved convex sealing surface configured to compress on contact with the driveshaft or sealing cylinder and/or the external sealing surface comprises an external sealing lip with a curved convex sealing surface configured to compress on contact with the internal surface of the seal assembly housing.

11. The fluid pressure pulse generating tool of claim 10, wherein the seal section comprises the internal sealing lip and the external sealing lip and a spring is positioned between the internal sealing lip and the external sealing lip.

12. The fluid pressure pulse generating tool of claim 9, wherein the heel section is longitudinally extended relative to the seal section.

13. The fluid pressure pulse generating tool of claim 9, wherein the annular heel section is configured to provide an interference fit with the internal surface of the seal assembly housing and the seal further comprises an annular gap section positioned between the seal section and the heel section, wherein the gap section has an outer diameter less than the outer diameter of the heel section.

14. The fluid pressure pulse generating tool of claim 13, wherein the heel section comprises at least one channel extending along an external surface of the heel section.

15. The fluid pressure pulse generating tool of claim 9, wherein the annular heel section is configured to provide an interference fit with the driveshaft or sealing cylinder and the seal further comprises an annular gap section positioned between the seal section and the heel section, wherein the gap section has an inner diameter greater than the inner diameter of the heel section.

16. The fluid pressure pulse generating tool of claim 15, wherein the heel section comprises at least one channel extending along an internal surface of the heel section.

17. The fluid pressure pulse generating tool of claim 9, wherein the seal assembly housing comprises a first section and a second section configured to releasably mate with the first section.

18. A driveshaft unit for a fluid pressure pulse generating tool comprising:
(a) a longitudinally extending cylindrical driveshaft with a first end for coupling with a fluid pressure pulse generator of the tool and an opposed second end for coupling with a pulse generating motor of the tool; and
(b) a seal assembly comprising a seal assembly housing with a longitudinally extending bore therethrough that receives the driveshaft and a seal enclosed by the seal assembly housing, the seal comprising:
(i) an annular seal section comprising an internal sealing surface in sealing contact with the driveshaft or a sealing cylinder surrounding the driveshaft and an external sealing surface in sealing contact with an internal surface of the seal assembly housing; and
(ii) an annular heel section providing an interference fit with the driveshaft or with the internal surface of the seal assembly housing.

\* \* \* \* \*